(12) United States Patent
Kim et al.

(10) Patent No.: US 12,544,189 B2
(45) Date of Patent: Feb. 10, 2026

(54) METHOD FOR CONVERTING PART OF DENTAL IMAGE AND APPARATUS THEREFOR

(71) Applicant: DENCOMM INC., Seoul (KR)

(72) Inventors: Sunho Kim, Seoul (KR); Jaeyoung Kim, Gyeonggi-do (KR); Hongseok Lee, Seoul (KR)

(73) Assignee: DENCOMM INC., Seoul (KR)

( * ) Notice: Subject to any disclaimer, the term of this patent is extended or adjusted under 35 U.S.C. 154(b) by 377 days.

(21) Appl. No.: 18/024,274

(22) PCT Filed: Aug. 26, 2021

(86) PCT No.: PCT/KR2021/011452
§ 371 (c)(1),
(2) Date: Mar. 2, 2023

(87) PCT Pub. No.: WO2022/055158
PCT Pub. Date: Mar. 17, 2022

(65) Prior Publication Data
US 2024/0024074 A1    Jan. 25, 2024

(30) Foreign Application Priority Data
Sep. 8, 2020 (KR) .................. 10-2020-0114561

(51) Int. Cl.
*A61C 7/00* (2006.01)
*A61B 34/10* (2016.01)

(52) U.S. Cl.
CPC ............. *A61C 7/002* (2013.01); *A61B 34/10* (2016.02); *A61B 2034/104* (2016.02); *A61B 2034/105* (2016.02); *A61B 2034/107* (2016.02)

(58) Field of Classification Search
CPC ........ A61B 2034/104; A61B 2034/105; A61B 2034/107; A61B 34/10; A61C 7/002; G06N 3/045; G06N 3/0895
See application file for complete search history.

(56) References Cited

U.S. PATENT DOCUMENTS

2020/0305808 A1* 10/2020 Ezhov .................... G16H 50/20
2020/0306011 A1* 10/2020 Chekhonin ............ G16H 30/40
2020/0405242 A1* 12/2020 Kearney ................ G06N 3/088

FOREIGN PATENT DOCUMENTS

JP   2019-162426 A   9/2019
JP   2020-503919 A   2/2020
(Continued)

OTHER PUBLICATIONS

Korean Intellectual Property Office, International Search Report and International Written Opinion Issued on International Application No. PCT/KR2021/011452, Dec. 15, 2021, 12 pages.
(Continued)

*Primary Examiner* — John R Wallace
(74) *Attorney, Agent, or Firm* — Nicholas Park

(57) ABSTRACT

Disclosed are a method and an apparatus for converting a part of a dental image. The method for converting a part of a dental image may comprise the steps of: receiving a dental image; receiving a user input corresponding to a conversion region of the dental image and a target type; and generating an output dental image in which the conversion region has been converted into the target type by using a pre-trained generation model.

15 Claims, 8 Drawing Sheets

(56) References Cited

FOREIGN PATENT DOCUMENTS

| KR | 10-2019-0065590 A | 6/2019 |
| KR | 10-2019-0077859 A | 7/2019 |
| KR | 10-2019-0090664 A | 8/2019 |
| KR | 10-2019-0142687 A | 12/2019 |
| WO | 2018-175486 A1 | 9/2018 |

OTHER PUBLICATIONS

Korean Intellectual Property Office, Office Action issued on Korean Application No. 10-2020-0114561, Feb. 24, 2022, 6 pages.
Korean Intellectual Property Office, Notice of Allowance issued on Korean Application No. 10-2020-0114561, Jul. 11, 2022, 6 pages.

* cited by examiner

METHOD FOR CONVERTING PART OF DENTAL IMAGE AND APPARATUS THEREFOR

CROSS-REFERENCE TO RELATED APPLICATION

This application is the National Phase of PCT International Application No. PCT/KR2021/011452, filed on Aug. 26, 2021, which claims the benefit of Korean Application No. 10-2020-0114561 filed on Sep. 8, 2020, which is hereby incorporated by reference herein in their entirety.

BACKGROUND

Technical Field

Embodiments below relate to a method and a device for converting a portion of a dental image, and specifically, to a deep learning-based image processing algorithm that virtually creates a shape desired by a user, such as a virtual tooth or a dental implant, when a portion to be converted in the dental image is given.

Background

When identifying a medical image and establishing a treatment plan in a medical field, it is difficult for a specialist to gain patient's trust because the specialist cannot show a patient a state after treatment or a treatment process.

Recently, a deep learning technology has been applied to various fields from a software technology to finance and economy. In particular, the deep learning technology is positioned as a key technology leading a rapid development of computer vision and image processing fields.

Therefore, in the process of establishing the treatment plan using such deep learning technology, a technology capable of showing the state after the treatment or an appearance of the treatment process is required.

SUMMARY

Technical Problem

Embodiments are to show the state after the treatment or the treatment process to the patient by converting the predetermined area in the dental image to reflect the state after the treatment or the appearance of the treatment process.

Embodiments are to train the deep learning-based model that converts the predetermined area in the dental image to reflect the state after the treatment or the appearance of the treatment process.

Embodiments are to improve the accuracy and the generalization performance of the deep learning-based models by generating the virtual area with the abnormal finding to balance the distribution of the biased data.

The technical tasks to be achieved in the present disclosure are not limited to the technical tasks mentioned above, and other technical tasks not mentioned will be clearly understood by those skilled in the art to which the present disclosure belongs from the description below.

Technical Solutions

According to an aspect of the present disclosure, a method for converting a portion of a dental image includes receiving the dental image, receiving a user input corresponding to a conversion area of the dental image and a target type, and generating an output dental image where the conversion area is converted to reflect the target type using a pre-trained generative model.

In one implementation, the generating of the output dental image may include masking the conversion area of the dental image, and inputting the masked dental image into a generative model corresponding to the target type to generate the output dental image where the conversion area of the dental image is converted to reflect the target type.

In one implementation, the target type may include at least one of a first type corresponding to a normal state where no additional treatment is performed, a second type corresponding to a state recovered via the treatment, a third type corresponding to an abnormal state, and a fourth type corresponding to an under-treatment state.

In one implementation, the pre-trained generative model may be pre-trained based on a training image converted from an original dental image, and the training image may be generated by converting the original dental image using conversion information including annotation information for each type of semantic area contained in the original dental image.

In one implementation, the pre-trained generative model may be pre-trained based on a difference between the original dental image and the training image.

In one implementation, the semantic area may correspond to an individual tooth area contained in the dental image, and the conversion information may include at least one of annotation information of a normal state type, annotation information of a post-treatment state type, annotation information of an under-treatment state type, and annotation information of an abnormal state type.

In one implementation, the training image may determine an area-to-be-masked among the semantic areas based on the annotation information for each type, and the training image may be generated from the original dental image by masking the area-to-be-masked in the original dental image.

In one implementation, the training image may include a plurality of images with different areas-to-be-masked in the original dental image.

According to another aspect of the present disclosure, a device for converting a portion of a dental image includes a processor that receives the dental image, receives a user input corresponding to a conversion area and a target type, masks the conversion area of the dental image, and inputs the masked image to a pre-trained generative model to generate an output dental image where the conversion area of the dental image is converted to reflect the target type.

In one implementation, the generated output dental image may be generated via a generative sub-model corresponding to the target type of the pre-trained generative model.

In one implementation, the target type may include at least one of a first type corresponding to a normal state where no additional treatment is performed, a second type corresponding to a state recovered via the treatment, a third type corresponding to an abnormal state, and a fourth type corresponding to an under-treatment state.

In one implementation, the generative model may include a generative sub-model corresponding to the target type and may be pre-trained based on a training image converted from an original dental image, and the training image for a generative sub-model corresponding to one target type may be generated by converting the original dental image using type annotation information corresponding to a semantic area contained in the original dental image.

In one implementation, the semantic area may correspond to an individual tooth area contained in the dental image, and the type annotation information may include annotation information of a normal state type, annotation information of a post-treatment state type, annotation information of an under-treatment state type, or annotation information of an abnormal state type.

In one implementation, the training image for the generative sub-model corresponding to the target type may determine an area-to-be-masked among the semantic areas based on the type annotation information, and the training image for the generative sub-model corresponding to the target type may be generated from the original dental image by masking the area-to-be-masked.

Advantageous Effects

The embodiments may show the patient the state after the treatment or the treatment process by converting the predetermined area in the medical image to reflect the state after the treatment or the appearance of the treatment process.

The embodiments may train the deep learning-based model that converts the predetermined area in the medical image to reflect the state after the treatment or the appearance of the treatment process.

The embodiments may improve the accuracy and the generalization performance of the deep learning-based models by generating the virtual area with the abnormal findings to balance the distribution of the biased data.

BRIEF DESCRIPTION OF THE DRAWINGS

The drawings below, which are attached to be used for the description of the embodiments of the present disclosure, are only some of the embodiments of the present disclosure. For those skilled in the art to which the present disclosure belongs, other drawings may be obtained based on such drawings without effort leading to a separate invention.

DETAILED DESCRIPTION

Figure 1:
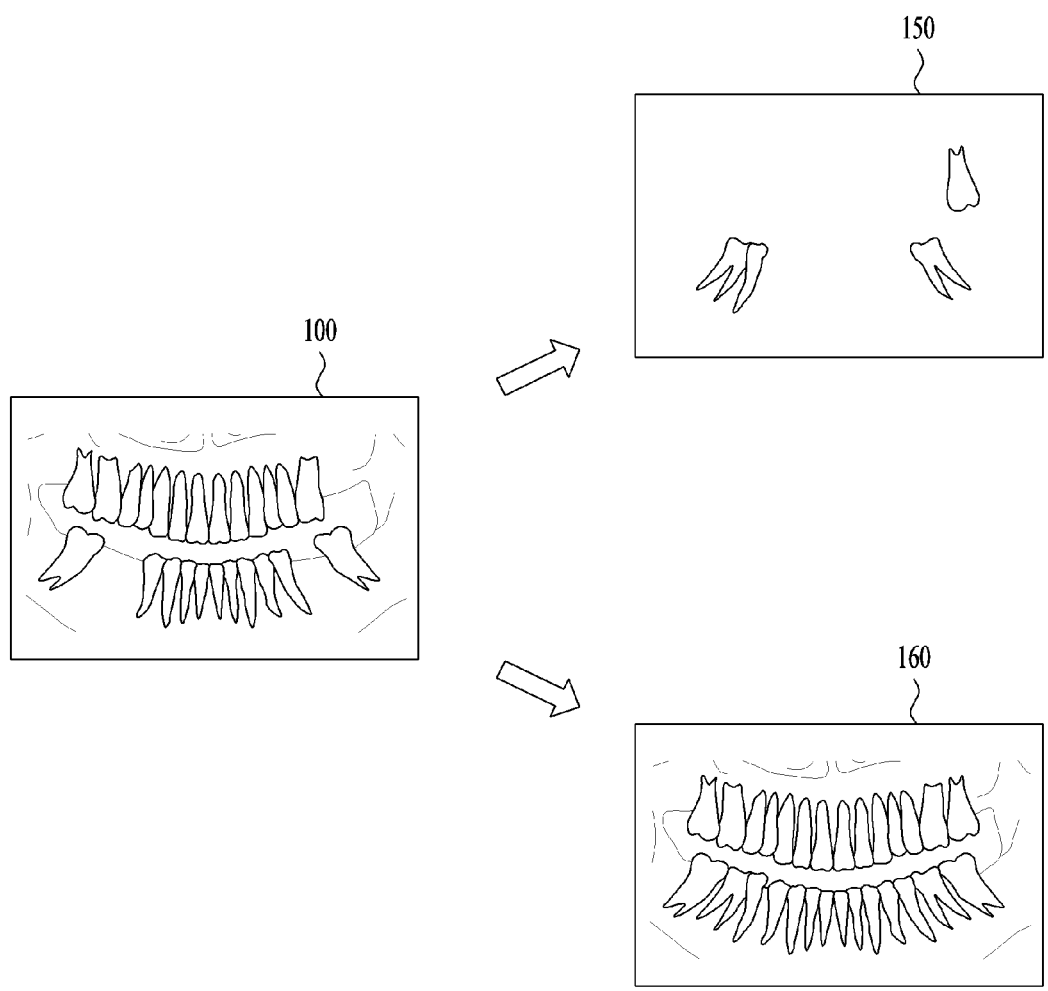
FIG. 1 is a view showing an example of showing a state after treatment or a treatment process to a patient by converting a predetermined area in a dental image to reflect the state after the treatment or an appearance of the treatment process according to one embodiment.

Specific structural or functional descriptions disclosed herein are merely exemplified for the purpose of illustrating embodiments based on technical concepts. The embodiments may be implemented in many different forms and the present disclosure is not limited to the embodiments described herein.

Terms such as first or second may be used to describe various components, but such terms should only be understood for the purpose of distinguishing one component from another. For example, a first component may be termed a second component, and similarly, the second component may also be termed the first component.

When one component is referred to as being "connected" to another component, it should be understood that, although the former component may be directly connected to the latter component, a third component may exist therebetween. On the other hand, when one component is referred to as "directly connected" to another component, it should be understood that no other element exists therebetween. Expressions describing a relationship between components, such as "between" and "directly between" or "adjacent to" and "directly adjacent to", should be interpreted similarly.

Singular expressions include plural expressions unless the context clearly dictates otherwise. Herein, it should be understood that the terms 'comprises', 'comprising', 'includes', and 'including' when used herein, specify the presence of the features, numbers, steps, operations, components, parts, or combinations thereof described herein, but do not preclude the presence or addition of one or more other features, numbers, steps, operations, components, or combinations thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments may be implemented in various forms of products such as a personal computer, a laptop computer, a tablet computer, a smart phone, a television, a smart home appliance, an intelligent vehicle, a digital kiosk, and a wearable device. Hereinafter, embodiments will be described in detail with reference to the accompanying drawings. Like reference numerals in each drawing indicate like elements.

As used throughout the description and claims of the present disclosure, a term "image" or "image data" refers to multidimensional data composed of discrete image elements (e.g., pixels for a two-dimensional image and voxels for a three-dimensional image). For example, the "image" may mean an X-ray image or medical images of a subject collected by a (cone-beam) computed tomography, a magnetic resonance imaging (MM), a sonogram, or any other medical image system known in the art. In addition, the image may also be provided in a non-medical context, for example, a remote sensing system, an electron microscopy, and the like.

As used throughout the description and claims of the present disclosure, the 'image' is a term that refers to a visible image (e.g., displayed on a video screen) or a digital representation of an image (e.g., a file corresponding to a pixel output of a CT, an Mill detector, and the like).

As used throughout the description and claims of the present disclosure, a 'DICOM (Digital Imaging and Communications in Medicine)' standard is a term that collectively refers to various standards used for digital image expression and communication in medical devices. The DICOM standard is published by a joint committee formed by the American College of Radiology (ACR) and the National Electrical Manufacturers Association (NEMA).

In addition, as used throughout the description and claims of the present disclosure, a 'PACS (picture archiving and communication system)' is a term that refers to a system that stores, processes, and transmits the medical image based on the DICOM standard. The medical image obtained using digital medical imaging equipment such as the X-ray, the CT, and the MM may be stored in a DICOM format and may be transmitted to terminals inside and outside a hospital via a network. A reading result and a medical record may be added to the PACS.

In addition, as used throughout the description and claims of the present disclosure, 'learning' is a term that refers to performing of machine learning via procedural computing. It will be appreciated by those skilled in the art that the term 'learning' is not intended to refer to mental operations such as human educational activities.

FIG. 1 is a view showing an example of showing a state after treatment or a treatment process to a patient by converting a predetermined area in a dental image to show the state after the treatment or an appearance of the treatment process according to one embodiment.

Referring to FIG. 1, a dental image 100 according to one embodiment may be a CT image or an X-ray panoramic image of patient's teeth before treatment. Those skilled in the art will understand that the dental image referred to in the present disclosure may refer to any image generally targeting teeth in addition to the exemplary image described above. As described above, conventionally, there was a problem in that a doctor cannot show a state after the treatment or a treatment process to a patient. A dental image portion conversion device according to one embodiment may show a state after the treatment or an appearance of a treatment process in a process of establishing a treatment plan using a deep learning technology.

The dental image portion conversion device according to one embodiment may be a deep learning-based image processing device that, when a portion to be converted in the dental image is given, virtually creates a shape desired by a user of the corresponding portion (or area).

For example, the dental image portion conversion device may generate an output dental image 150 in which a tooth loss area of the dental image 100 is converted to reflect a tooth after the treatment or a tooth during the treatment process. The output dental image may be in a form independent of the dental image 100, like the output dental image 150 in FIG. 1, or may be in a form 160 synthesized with the dental image 100.

The dental image portion conversion device may include a neural network-based generative model. The neural network-based generative model may generate the output image by mapping input data and output data in a non-linear relationship to each other based on the deep learning.

The deep learning is a machine learning technique for solving problems such as image or speech recognition from big data sets. The deep learning may be understood as an optimization problem solving process that finds a point where energy is minimized while training a neural network using prepared training data. Via supervised or unsupervised learning in the deep learning, a weight corresponding to a structure or a model of the neural network may be obtained, and the input data and the output data may be mapped to each other via such weight.

The generative model may be built via a generative model training device. The building of the generative model may refer to a process of training the neural network associated with the generative model. When building the generative model, it may be difficult to secure data with abnormal findings because of characteristics of the dental image, and a performance degradation of the generative model may occur because of data bias.

The generative model training device according to one embodiment may generate a virtual area with the abnormal findings in the training data to balance a distribution of the biased data, and accordingly, improve accuracy and a generalization performance of the neural network-based generative model. Hereinafter, a relationship between the generative model training device and the dental image portion conversion device will be described with reference to FIG. 2.

Figure 2:
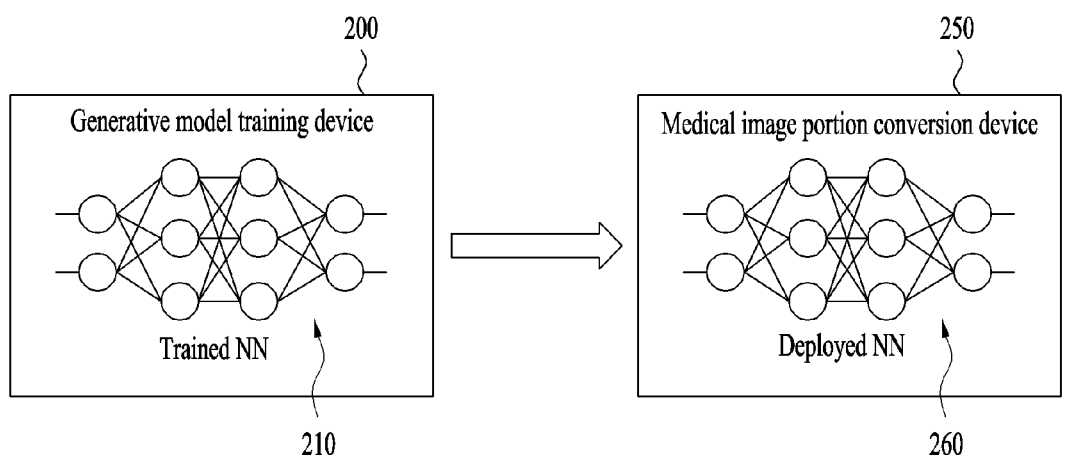
FIG. 2 is a view for illustrating a relationship between a generative model training device and a dental image portion conversion device according to one embodiment.

FIG. 2 is a view for illustrating a relationship between a generative model training device and a dental image portion conversion device according to one embodiment.

Referring to FIG. 2, a generative model training device 200 according to one embodiment corresponds to a computing device having various processing functions such as a function of generating the neural network, a function of training the neural network, or a function of retraining the neural network. For example, the generative model training device 200 may be implemented as various types of devices such as a personal computer (PC), a server device, and a mobile device.

The generative model training device 200 may generate a trained neural network 210 by repeatedly training a given initial neural network. The generation of the trained neural network 210 may mean determining neural network parameters. In this regard, the parameters may include, for example, various types of data input/output to/from the neural network, such as input/output activations, weights, and biases of the neural network. As the iterative training of the neural network progresses, the parameters of the neural network may be tuned to compute a more accurate output for a given input.

The generative model training device 200 may transfer the trained neural network 210 to a dental image portion conversion device 250. The dental image portion conversion device 250 may be included in a mobile device, an embedded device, or the like. The dental image portion conversion device 250 may be dedicated hardware for driving the neural network.

The dental image portion conversion device 250 may drive the trained neural network 210 as it is or drive a neural network 260 obtained by processing (e.g., quantizing) the trained neural network 210. The dental image portion conversion device 250 that drives the processed neural network 260 may be implemented in an independent device separated from the generative model training device 200. However, the present disclosrue may not be limited thereto, and the dental image portion conversion device 250 may be implemented in the same device as the generative model training device 200.

Figure 3:
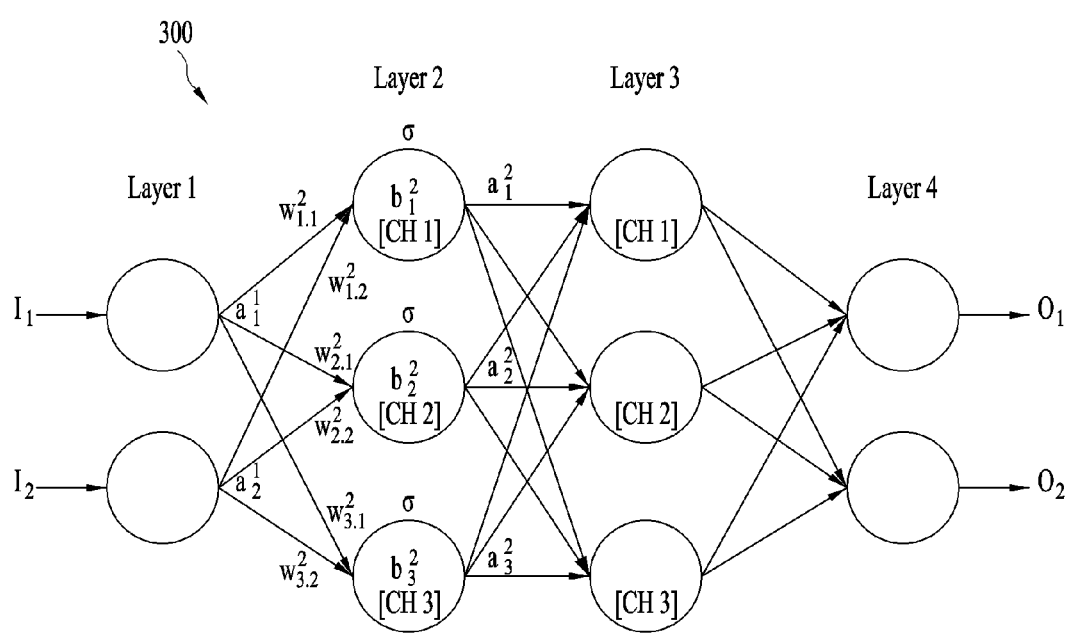
FIG. 3 is a view for illustrating an operation performed in a neural network according to one embodiment.

FIG. 3 is a view for illustrating an operation performed in a neural network according to one embodiment.

Referring to FIG. 3, a neural network 300 may have a structure including an input layer, hidden layers, and an output layer, may perform an operation based on received input data (e.g., $I_1$ and $I_2$), and may generate output data (e.g., $01$ and $02$) based on the performance result.

The neural network 300 may be a DNN or n-layer neural network including two or more hidden layers. For example, as shown in FIG. 2, the neural network 300 may be a DNN including an input layer Layer 1, two hidden layers Layer 2 and Layer 3, and an output layer Layer 4. The DNN may include a convolutional neural network (CNN), a recurrent neural network (RNN), a deep belief network, a restricted Boltzman machine, and the like, but may not be limited thereto.

When the neural network 300 is implemented as a DNN architecture, because the neural network 300 includes more layers that may process valid information, the neural network 300 may process more complex data sets than a neural network having a single layer. Although the neural network 300 is illustrated as including the four layers, this is only an example. The neural network 300 may include fewer or more layers or fewer or more channels. That is, the neural network 300 may include layers having various structures different from those shown in FIG. 3.

Each of the layers included in the neural network 300 may include a plurality of channels. The channel may correspond to a plurality of artificial nodes known as neurons, processing elements (PEs), units, or similar terms. For example, as shown in FIG. 3, the Layer 1 may include two channels (nodes), and each of the Layers 2 and 3 may include three channels. However, this is only an example, and each of the layers included in the neural network 300 may include various numbers of channels (nodes).

The channels included in each of the layers of the neural network 300 may be connected to each other to process data. For example, one channel may receive data from other channels, perform the operation, and output operation results to still other channels.

An input and an output of each of the channels may be referred to as an input activation and an output activation. That is, the activation may be a parameter corresponding to an output of one channel, and at the same time, inputs of channels included in a next layer. Each of the channels may determine an activation thereof based on activations received from channels included in a previous layer, a weight, and a bias. The weight, as a parameter used to calculate the output activation of each channel, may be a value assigned to a connection relationship between the channels.

Each of the channels may be processed by a computational unit or processing element that receives the input and outputs the output activation, and the input-output of each of the channels may be mapped to each other. For example, when $\sigma$ is an activation function, $w_{jk}{}^i$ is a weight from a k-th node included in an (i−1)-th layer to a j-th node included in an i-th layer, $b_j{}^i$ is a bias value of the j-th node included in the i-th layer, and $a_j{}^i$ is an activation of the j-th node of the i-th layer, the activation $a_j{}^i$ may follow Equation 1 below.

$$a_j^i = \sigma\left(\sum_k (w_{jk}^i \times a_k^{i-1}) + b_j^i\right) \quad \text{[Equation 1]}$$

$$a_1^2 = \sigma(w_{1,1}^2 \times a_1^1 + w_{1,2}^2 \times a_2^1 + b_1^2)$$

Figure 4:
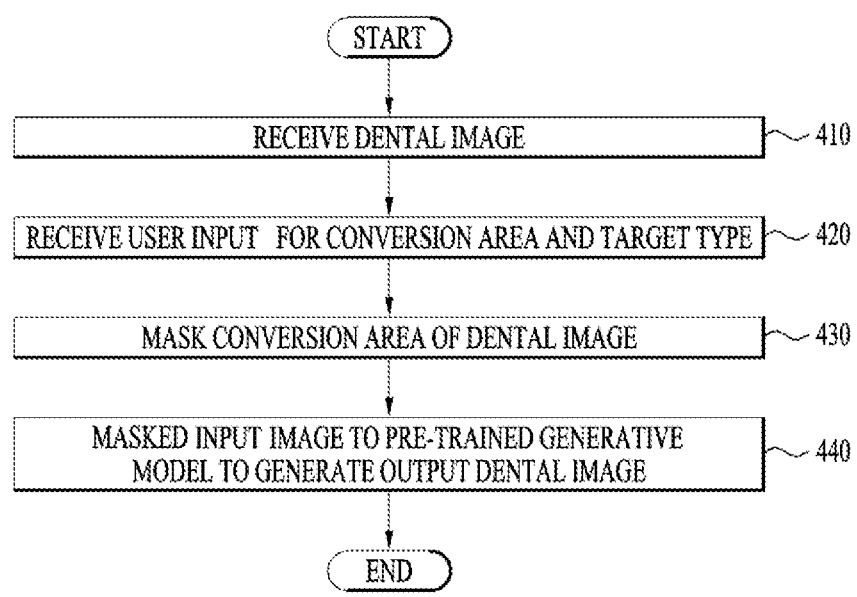
FIG. 4 is a flowchart for illustrating a dental image portion conversion method according to one embodiment.

FIG. 4 is a flowchart for illustrating a dental image portion conversion method according to one embodiment.

Referring to FIG. 4, steps 410 to 440 according to one embodiment may be performed by the dental image portion conversion device 250 described above with reference to FIGS. 1 to 3. The dental image portion conversion device 250 may be implemented by one or more hardware modules, one or more software modules, or various combinations thereof.

In step 410, the dental image portion conversion device 250 receives the dental image. For example, the dental image portion conversion device 250 may receive the CT image of the patient's teeth before the treatment.

In step 420, the dental image portion conversion device 250 receives user inputs for a conversion area and a target type. The conversion area may refer to an area to be converted in the dental image, and the target type may refer to a type to be converted. For example, in the case of implant placement treatment, the doctor may use an input interface (e.g., a mouse) to specify an area where a dental implant is to be placed in a rectangular shape and input the dental implant as the target type in the teeth CT image displayed on an output interface (e.g., a monitor) of the dental image portion conversion device 250.

Types or the target types according to one embodiment may include a normal state, an abnormal state, and an under-treatment state. The normal state may be classified into a normal state corresponding to a normal tooth to which no additional treatment has been performed and a normal state recovered via the treatment (e.g., the normal state may be a normal state tooth that has undergone a treatment such as an amalgam cavity treatment or the dental implant). The abnormal state may be classified based on an abnormality type (e.g., a disease name). The under-treatment state may be classified based on a combination of treatment type and treatment period. For example, the treatment type may include any treatment that may be performed in a dental treatment, such as the implant placement, a periodontal disease treatment, and a tooth decay treatment, and the treatment period may be divided into early, mid, and late phases. However, the descriptions of the type and the period of the treatment are merely exemplary descriptions to aid understanding and the present disclosure should not be construed as being limited thereto. In addition, those skilled in the art will understand that the exemplary interface, such as the shape of the area where the dental implant to be placed, described above is only for illustration and the present disclosure is not limited thereto.

In step 430, the dental image portion conversion device 250 masks the conversion area of the dental image.

In step 440, the dental image portion conversion device 250 inputs the masked image to a pre-trained generative model to generate an output dental image, which is a virtual image in which the conversion area of the dental image is converted to reflect the target type. In this regard, the pre-trained generative model may include a plurality of pre-trained generative sub-models corresponding to respective target types, and the output dental image may be generated via a generative sub-model corresponding to the input target type among the plurality of pre-trained generative sub-models. Therefore, the dental image portion conversion device 250 may present a scenario of the treatment process or a result after the treatment.

Alternatively, the pre-trained generative model may be pre-trained based on a training image converted from the original dental image using type annotation information corresponding to a semantic area contained in the original dental image as described above. The type annotation information may include annotation information of a normal state type, annotation information of a post-treatment state type, annotation information of an under-treatment state type, and/or annotation information of an abnormal state type.

For example, the pre-trained generative model may include a first generative sub-model trained based on the training image converted or generated from the original dental image using the normal state type annotation information, a second generative sub-model trained based on the training image converted or created from the original dental image using post-treatment state type annotation information, a third generative sub-model trained based on the training image converted or generated from the original dental image using under-treatment state type annotation information, and/or a fourth generative sub-model trained based on the training image converted or generated from the original dental image using abnormal state type annotation information.

In this case, the dental image portion conversion device 250 may generate the output dental image using the generative sub-model corresponding to the input target type of the generative model. For example, when the input target type is the post-treatment state type, the dental image portion conversion device 250 may generate the output dental image via the pre-trained generative sub-model (e.g., the second generative sub-model) corresponding to the post-treatment state type.

Exemplarily, when the conversion area is determined to be a lower right canine area and the target type corresponding to the implant placement treatment is determined based on the user inputs, the dental image portion conversion device 250 may use the pre-trained generative model to generate a virtual image in a form in which a virtual dental implant is placed in the lower right canine area, and output the generated virtual image as the output dental image. In addition, when an implant placement treatment period is determined to be the mid phase on the target type, the dental image portion conversion device 250 may generate a virtual image in a form in which a period (e.g., 2 months) corresponding to the mid phase is passed after the implant placement treatment is performed. A person skilled in the art will understand that the treatment period may be implemented not only by inputting the phase as illustrated, but also by inputting a specific period. The dental image portion conversion device 250 may provide a prediction image for a treatment progress as well as a treatment result by generating the different virtual images for the input treatment periods, thereby more gaining patient's trust.

According to one embodiment, the dental image portion conversion device 250 may generate virtual images of different shapes based on a size of the conversion area. A scheme in which the user may freely adjust the size of the conversion area via the interface may be used. For example, the dental image portion conversion device 250 may adjust a size of a tooth (or the dental implant or the like) contained in the virtual image based on the size of the conversion area. In addition, the dental image portion conversion device 250 may generate a virtual image in which different numbers of teeth (or the dental implants or the like) are added based on the size of the conversion area. For example, when the size of the conversion area exceeds a predetermined threshold, the dental image portion conversion device 250 may generate a virtual image containing two normal teeth in the corresponding area, and when the size of the conversion area is equal to or smaller than the predetermined threshold value, the dental image portion conversion device 250 may generate a virtual image containing one normal tooth in the corresponding area.

In the previous example, the method in which the number and the size of teeth synthesized based on the size of the conversion area are adjusted is only exemplary, and the present disclosure may be extended in any manner in which the number and the size of teeth synthesized based on the size of the conversion area are adjusted. For example, because a threshold may be adjusted for each area, when a conversion area of a predetermined size is formed in a molar area, a normal tooth in a form of one molar may be synthesized in the conversion area, and when the conversion area of the predetermined size corresponds to a front teeth area, two front teeth may be synthesized in the conversion area. Depending on a location of the conversion area, suitable tooth such as the molar and the canine may be formed. In addition, as described above, those skilled in the art will understand that the present disclosure may be implemented such that a tooth of a size and a shape suitable for the conversion area is synthesized based on the location of the conversion area.

As described above, the generative model may be built for each target type. That is, the generative model may include the plurality of pre-trained generative sub-models for the respective target types. A method for constructing the generative model will be described below with reference to FIGS. 5 and 6.

Figure 5:
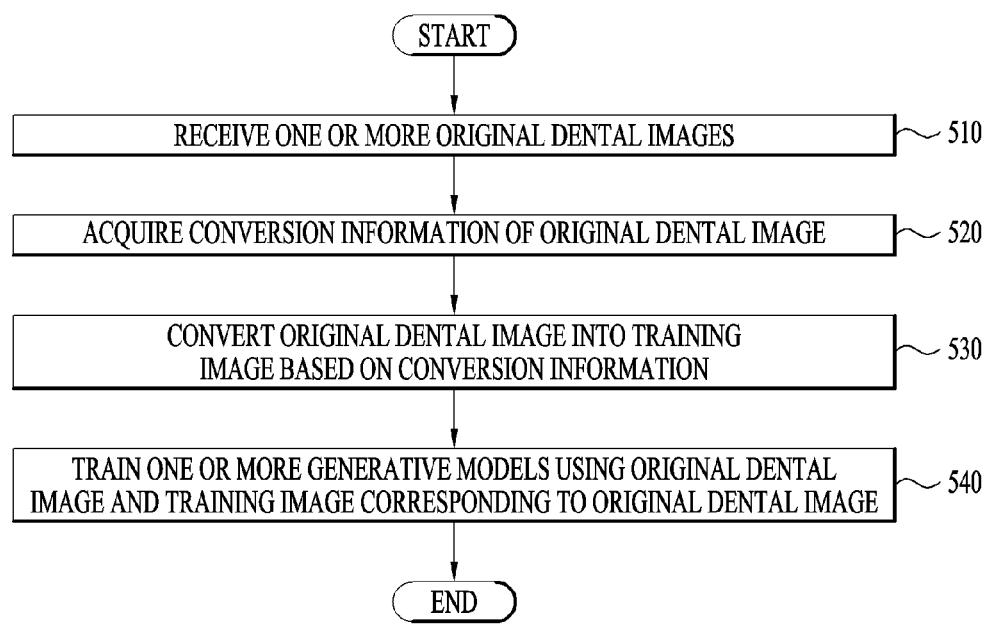
FIG. 5 is a flowchart illustrating a generative model training method according to one embodiment.

FIG. 5 is a flowchart illustrating a generative model training method according to one embodiment.

Referring to FIG. 5, steps 510 to 540 according to one embodiment may be performed by the generative model training device 200 described above with reference to FIGS. 1 to 3. The generative model training device 200 may be implemented by one or more hardware modules, one or more software modules, or various combinations thereof.

At step 510, the generative model training device 200 receives one or more original dental images. The original dental images may be various dental images collected for training the generative model.

In step 520, the generative model training device 200 acquires conversion information of the original dental image. The conversion information of the original dental image may include annotation information for respective types of one or more semantic areas contained in the original dental image. The semantic area may mean a semantically marked state space having features such as the tooth and a gum in the original dental image. The annotation information for each type of the semantic area may mean type and location information (e.g., coordinates) corresponding to each semantic area.

In other words, the original dental image may contain the plurality of semantic areas, and the generative model training device 200 may obtain the annotation information for the respective types of the plurality of semantic areas and the conversion information including the annotation information. In this regard, the annotation information for each type of the semantic area or the annotation information may include the type and location information for the corresponding semantic area.

Here, the type of the semantic area or the type may correspond to the target type described with reference to FIG. 4. Specifically, the type of the semantic area or the type may include a first type for the normal state, a second type for the abnormal state, and a third type for the under-treatment state. The first type for the normal state may be classified into a first-first type, which is the normal state corresponding to the normal tooth to which no additional treatment has been performed, and a first-second type, which is the normal state recovered via the treatment (e.g., the normal state may be the normal state tooth that has undergone the treatment such as the amalgam cavity treatment or the dental implant). The second type for the abnormal state may be additionally classified based on the abnormality type (e.g., the disease name). The third type, which is the under-treatment state, may be additionally classified based on the combination of the treatment type and the treatment period. For example, the treatment type may include any treatment that may be performed in the dental treatment, such as the implant placement, the periodontal disease treatment, and the tooth decay treatment, and the treatment period may be divided into the early, mid, and late phases. However, the descriptions of the type and the period of the treatment are merely the exemplary descriptions to aid understanding and the present disclosure should not be construed as being limited thereto. In addition, those skilled in the art will understand that the exemplary interface, such as the shape of the area where the dental implant to be placed, described above is only for illustration and the present disclosure is not limited thereto.

In step 530, the generative model training device 200 converts the original dental image into the training image based on the conversion information. The generative model training device 200 may convert the original dental image into a training image for each type of the original dental image. In other words, the generative model training device 200 may convert the original dental image into the training image for each type or type of the above-described semantic area. For example, the generative model training device 200 may generate a first training image for a semantic area corresponding to the first type, a second training image for a semantic area corresponding to the second type, and a third training image for a semantic area corresponding to the third type from the original dental image.

More specifically, the generative model training device 200 may convert the original dental image into one or more training images in which a specific area is masked based on the annotation information for each type. The generative model training device may determine at least one semantic area among the plurality of semantic areas as an area-to-be-masked based on the annotation information for each type and mask the area-to-be-masked in the original dental image to convert the original dental image into the training image. The generative model training device 200 may determine at least one semantic area among the plurality of semantic areas as the area-to-be-masked and repeatedly perform an operation of masking the corresponding area to generate training images of various shapes from the single original dental image. For example, the plurality of training images of various shapes in which different areas are masked may be generated via the generation operation described above. The generative model training device 200 may provide simple data augmentation means via the scheme described above. The process of converting the original dental image to the training image may be performed for each type. For example, the generative model training device 200 may generate a training image in which a normal tooth area is masked from the original dental image or a training image in which an implant placement area is masked from the original dental image, depending on the type.

In other words, the generative model training device 200 may repeatedly generate the training image while changing the area-to-be-masked for each type. That is, the generative model training device 200 may generate the plurality of training images from the original dental image for each type. For example, the generative model training device 200 may perform an operation of determining a first semantic area among semantic areas corresponding to the first type as the area-to-be-masked and masking the first semantic area to convert the original dental image into the first training image, and changing the area-to-be-masked and determining a second semantic area (a semantic area different from the first semantic area) among the semantic areas as the area-to-be-masked and masking the second semantic area to convert the original dental image into a second training image.

In step 540, the generative model training device 200 trains the generative model including the plurality of generative sub-models using the original dental image and the training image corresponding to the original dental image. A purpose of training the neural network may be determining a parameter that minimizes a loss function. The loss function may be used as an index for determining an optimal parameter in the process of training the artificial neural network. The loss function according to one embodiment may be defined as a difference between the original dental image and the output dental image of the neural network output based on the training image, and the generative model training device 200 may determine a parameter that minimizes the difference between the original dental image and the output dental image of the neural network output based on the training image. For example, the difference between the original dental image and the output dental image may be determined based on a difference between a pixel value of the semantic area of the original dental image and a pixel value of the semantic area of the output image. Accordingly, the generative model training device 200 may train the generative model equipped with the generative sub-models for the respective types using the original dental image and the training image for each type of the original dental image.

In other words, the generative model training device 200 may compare the training image generated for each type of the original dental image with the original dental image and determine the parameter of the loss function capable of minimizing the difference between the two images based on the comparison result to train the generative sub-model corresponding to each type. As described above, the generative model may include the plurality of pre-trained sub-generative models corresponding to each type.

Figure 6:
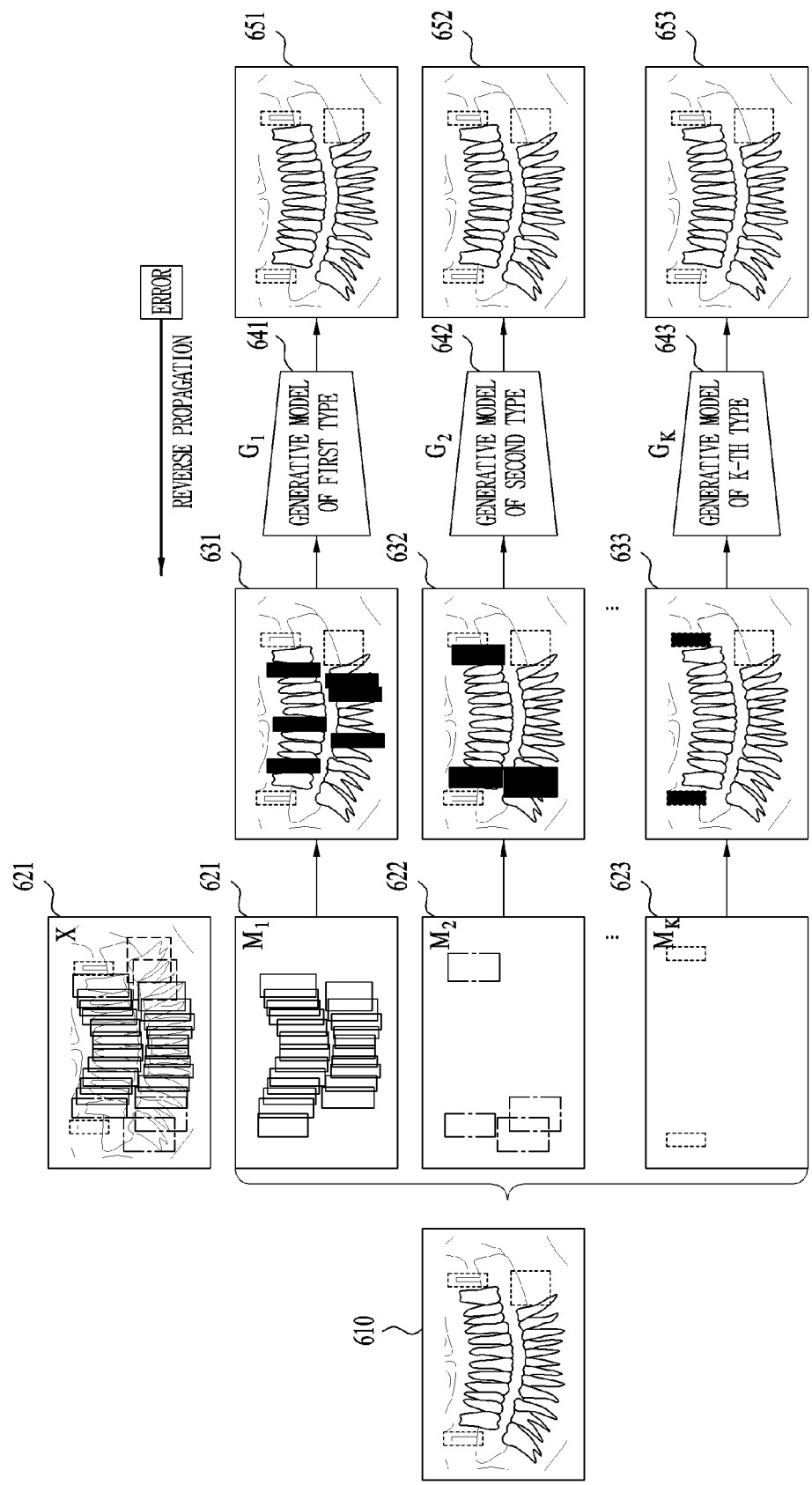
FIG. 6 is a view illustrating an example for illustrating a generative model training method according to one embodiment.

FIG. 6 is a view illustrating an example for illustrating a generative model training method according to one embodiment.

Referring to FIG. 6, the generative model training device 200 according to one embodiment may receive an original dental image 610. Furthermore, the generative model training device 200 may obtain conversion information 620 of the original dental image 610. As described above, the conversion information 620 may include the type information and the location information of the semantic area.

More specifically, the conversion information 620 may include annotation information 621 of the normal state type (a normal tooth type), annotation information 622 of the post-treatment state type (a post-treatment tooth type), and annotation information 623 of an implant screw type. The types presented in FIG. 6 are only exemplary. The types, as types corresponding to diseased teeth, may be implemented as various types such as types classified based on a disease, types (a type for a state 1 month after the implant placement, a type for a state 2 months after the implant placement, and the like) determined based on information about a progress of the treatment or the disease as well as the type of the treatment or the disease, and the like. Alternatively, the type may correspond to the target type or the type of the semantic area described in FIGS. 4 to 5.

The generative model training device 200 may convert the original dental image into the training image based on the conversion information 620. For example, the generative model training device 200 may obtain a training image 631 corresponding to the annotation information 621 of the normal tooth type, a training image 632 corresponding to the annotation information 622 of the post-treatment tooth type, and the training image 633 corresponding to the annotation information 623 of the implant screw type.

The generative model training device 200 may select an arbitrary semantic area among a total of N semantic areas of a given type in the original dental image 610 as the area-to-be-masked to obtain a training image in which the corresponding area is masked. For example, the generative model training device 200 may select an arbitrary semantic area among four semantic areas of the post-treatment tooth type as the area-to-be-masked to obtain a training image in which the corresponding area is masked. In this regard, there may be a total of 15 combinations of semantic areas that may be selected by the generative model training device 200. Accordingly, the generative model training device 200 may secure various training images from one original dental image 610.

The generative model training device 200 may train the generative model for each type using the original dental image 610 and the training image. For example, a generative model 641 of the normal tooth type may be trained to minimize a difference between the original dental image 610 and an output dental image 651 of the generative model 641 of the normal tooth type. In addition, a generative model 642 of the post-treatment tooth type may be trained to minimize a difference between the original dental image 610 and an output dental image 652 of the generative model 642 of the post-treatment tooth type. Similarly, a generative model 643 of the implant screw type may be trained to minimize a difference between the original dental image 610 and an output dental image 653 of the generative model 643 of the implant screw type.

The generative model training device 200 may transfer the trained generative models 641, 642, and 643 for the respective types to the dental image portion conversion device 250, and the dental image portion conversion device 250 may generate the virtual images as the output dental images based on the trained generative models 641, 642, and 643 for the respective types.

Figure 7:
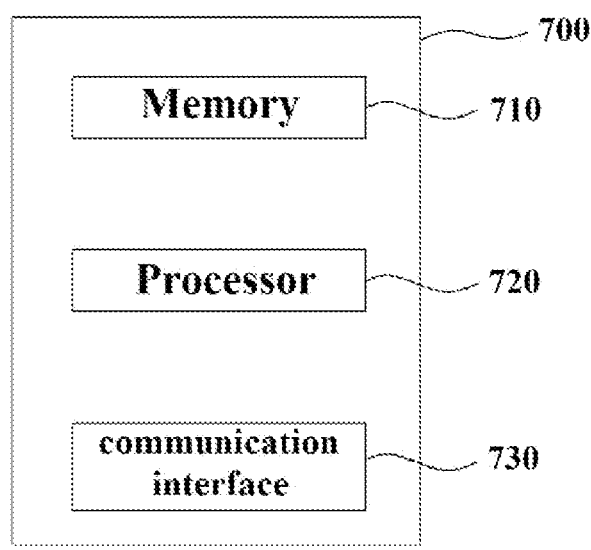
FIG. 7 is a block diagram for illustrating a dental image portion conversion device according to one embodiment.

FIG. 7 is a block diagram for illustrating a dental image portion conversion device according to one embodiment.

Referring to FIG. 7, a dental image portion conversion device 700 according to one embodiment includes a processor 720. The dental image portion conversion device 700 may further include a memory 710 and a communication interface 730. The processor 720, the memory 710, and the communication interface 730 may be in communication with each other via a communication bus (not shown).

The processor 720 receives the dental image, receives the conversion area and the target type, masks the conversion area of the dental image, and inputs the masked image to the generative model corresponding to the target type to generate the virtual image in which the conversion area of the dental image is converted to reflect the target type.

The memory 710 may be a volatile memory or a non-volatile memory.

In addition, the processor 720 may execute a program and control the dental image portion conversion device 700. Program codes executed by the processor 720 may be stored in the memory 710. The dental image portion conversion device 700 may be connected to an external device (e.g., the personal computer or a network) via an input/output device (not shown) and exchange data with the external device. The dental image portion conversion device 700 may be mounted on a server.

Figure 8:
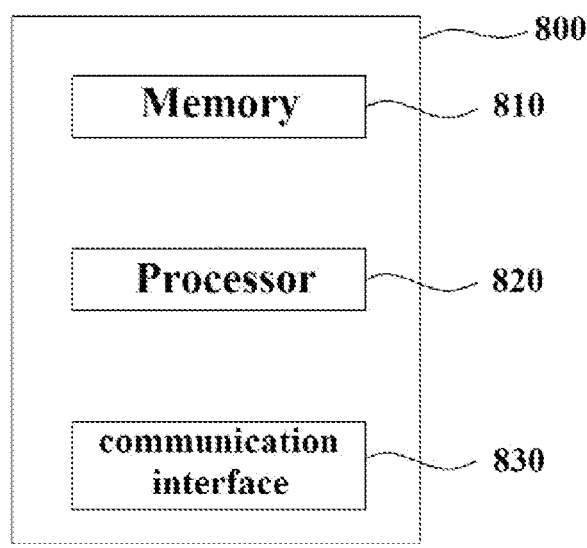
FIG. 8 is a block diagram for illustrating a generative model training device according to one embodiment.

FIG. 8 is a block diagram for illustrating a generative model training device according to one embodiment.

Referring to FIG. 8, a generative model training device 800 according to one embodiment includes a processor 820. The generative model training device 800 may further include a memory 810 and a communication interface 830. The processor 820, the memory 810, and the communication interface 830 may be in communication with each other via a communication bus (not shown).

The processor 820 receives the at least one original dental image, obtains the conversion information of the original dental image, converts the original dental image into the training image based on the conversion information, and trains at least one generative model using the original dental image and the training image corresponding to the original dental image.

The memory 810 may be the volatile memory or the non-volatile memory.

In addition, the processor 820 may execute a program and control the generative model training device 800. Program codes executed by the processor 820 may be stored in the memory 810. The generative model training device 800 may be connected to an external device (e.g., the personal computer or the network) via the input/output device (not shown) and exchange data with the external device. The generative model training device 800 may be mounted on the server.

The embodiments described above may be implemented by hardware components, software components, and/or combinations of the hardware components and the software components. For example, the device, the method, and the components described in the embodiments may be implemented using one or more general purpose or special purpose computers, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing device may run an operating system (OS) and one or more software applications running on the operating system. In addition, the processing device may also access, store, manipulate, process, and generate data in response to execution of software. For convenience of understanding, although there is a case in which one processing device is used, but those skilled in the art will understand that the processing device may include a plurality of processing elements and/or a plurality of types of processing elements. For example, the processing device may include a plurality of processors or one processor and one controller. In addition, other processing configurations such as parallel processors are also possible.

The software may include a computer program, codes, instructions, or a combination of one or more of those, and may configure the processing device to operate as desired or control the processing device independently or collectively. The software and/or the data may be permanently or temporarily embodied in any tangible machine, a component, a physical device, virtual equipment, a computer storage medium or device, or a transmitted signal wave to be interpreted by the processing device or to provide instructions or data to the processing device. The software may be distributed on networked computer systems and stored or executed in a distributed manner. The software and the data may be stored on one or more computer readable media.

The method according to the embodiment may be implemented in a form of program instructions that may be executed via various computer means and recorded on a computer readable medium. The computer readable medium may include program instructions, data files, data structures, and the like alone or in combination. The program instructions recorded on the medium may be specially designed and configured for the embodiment or may be known and usable to those skilled in computer software. Examples of the computer readable recording media include magnetic media, such as a hard disk, a floppy disk, and a magnetic tape, optical media, such as a CD-ROM and a DVD, magneto-optical media such as a floptical disk, and hardware devices specially configured to store and execute the program instructions, such as a ROM, a RAM, a flash memory, and the like. Examples of the program instructions include high-level language codes that may be executed by a computer using an interpreter or the like, as well as machine language codes such as those produced by a compiler.

As described above, although the embodiments have been described with limited drawings, those skilled in the art may apply various technical modifications and variations based on the above. For example, appropriate results may be achieved even when the described techniques are performed in an order different from that in the method described, and/or components such as the described system, the structure, the device, the circuit, or the like are coupled or combined with each other in a form different from that in the method described or replaced or substituted by other components or equivalents.

Therefore, other implementations, other embodiments, and equivalents of the claims are within the scope of the following claims.

INDUSTRIAL APPLICABILITY

Embodiments of the present disclosure as described above may be applied to various medical devices and the like.

What is claimed is:

1. A method for converting a dental image performed by a computing device, the method comprising:
   receiving the dental image;
   receiving a user input corresponding to a conversion area of the dental image and a target type; and
   generating, using a pre-trained generative model, an output dental image by converting the dental image such that a virtual image of at least one virtual tooth corresponding to the target type is included in the conversion area of the dental image,
   wherein, based on the target type including information for a treatment period type, the output dental image includes the virtual image of an intermediate treatment state of the at least one virtual tooth predicted based on an elapsed treatment period corresponding to the treatment period type,
   wherein a number of the at least one virtual tooth is determined based on a size of the conversion area and a threshold size, and
   wherein the threshold size is determined based on a position of the conversion area in the dental image.

2. The method of claim 1, wherein the generating of the output dental image includes:
   masking the conversion area of the dental image; and
   inputting the masked dental image into a generative model corresponding to the target type to generate the output dental image.

3. The method of claim 1, wherein the target type further includes at least one of a first type corresponding to a normal state where no additional treatment is performed, a second type corresponding to a state recovered via the treatment, a third type corresponding to an abnormal state, and a fourth type corresponding to an under-treatment state.

4. The method of claim 1, wherein the pre-trained generative model is pre-trained based on a training image converted from an original dental image,
   wherein the training image is generated by converting the original dental image using conversion information including annotation information for each type of semantic area contained in the original dental image.

5. The method of claim 4, wherein the pre-trained generative model is pre-trained based on a difference between the original dental image and the training image.

6. The method of claim 4, wherein the semantic area corresponds to an individual tooth area contained in the dental image,
   wherein the conversion information includes at least one of annotation information of a normal state type, annotation information of a post-treatment state type, annotation information of an under-treatment state type, and annotation information of an abnormal state type.

7. The method of claim 4, wherein the training image determines an area-to-be-masked among the semantic areas based on the annotation information for each type,
   wherein the training image is generated from the original dental image by masking the area-to-be-masked in the original dental image.

8. The method of claim 7, wherein the training image includes a plurality of images with different areas-to-be-masked in the original dental image.

9. A non-transitory computer-readable storage medium storing one or more programs including instructions for performing the method of claim 1.

10. A device for converting a dental image, the device comprising:
    a processor configured to:
    receive the dental image;
    receive a user input corresponding to a conversion area and a target type;
    mask the conversion area of the dental image;
    input the masked image to a pre-trained generative model; and,
    obtaining an output dental image including a virtual image of at least one virtual tooth corresponding to the target type for the masked conversion area from the pre-trained generative model,
    wherein, based on the target type including information for a treatment period type, the output dental image includes the virtual image of an intermediate treatment state of the at least one virtual tooth predicted based on an elapsed treatment period corresponding to the treatment period type,
    wherein a number of the at least one virtual tooth is determined based on a size of the conversion area and a threshold size, and
    wherein the threshold size is determined based on a position of the conversion area in the dental image.

11. The device of claim 10, wherein the generated output dental image is generated via a generative sub-model corresponding to the target type of the pre-trained generative model.

12. The device of claim 10, wherein the target type includes at least one of a first type corresponding to a normal state where no additional treatment is performed, a second type corresponding to a state recovered via the treatment, a third type corresponding to an abnormal state, and a fourth type corresponding to an under-treatment state.

13. The device of claim 10, wherein the generative model includes a generative sub-model corresponding to the target type and is pre-trained based on a training image converted from an original dental image,
    wherein the training image for a generative sub-model corresponding to one target type is generated by converting the original dental image using type annotation information corresponding to a semantic area contained in the original dental image.

14. The device of claim 13, wherein the semantic area corresponds to an individual tooth area contained in the dental image,
wherein the type annotation information includes annotation information of a normal state type, annotation information of a post-treatment state type, annotation information of an under-treatment state type, or annotation information of an abnormal state type.

15. The device of claim 13, wherein the training image for the generative sub-model corresponding to the target type determines an area-to-be-masked among the semantic areas based on the type annotation information,
wherein the training image for the generative sub-model corresponding to the target type is generated from the original dental image by masking the area-to-be-masked.

* * * * *